United States Patent [19]

Tanida

[11] 4,250,373
[45] Feb. 10, 1981

[54] TRANSFERRED TYPE PLASMA TORCH

[76] Inventor: Hiroshi Tanida, No. 2-2, Habikigaokanishi 2-chome, Habikino-shi, Osaka, Japan, 583

[21] Appl. No.: 48,950

[22] Filed: Jun. 15, 1979

[30] Foreign Application Priority Data

Jun. 16, 1978 [JP] Japan .................................. 53-73597

[51] Int. Cl.³ .............................................. B23K 9/16
[52] U.S. Cl. .................. 219/121 P; 219/75; 219/74; 313/231.4
[58] Field of Search ........... 219/121 P, 121 R, 137 R, 219/74, 75, 76.16; 313/231.4, 231.5

[56] References Cited

U.S. PATENT DOCUMENTS

| | | | |
|---|---|---|---|
| 3,471,676 | 10/1969 | Liebe et al. | 219/75 |
| 3,557,337 | 1/1971 | Sipos | 219/75 |
| 3,632,951 | 1/1972 | Klasson | 219/121 P |
| 3,940,586 | 2/1976 | Stearns et al. | 219/75 |
| 4,140,892 | 2/1979 | Muller | 219/121 P |
| 4,142,086 | 2/1979 | Rotilio | 219/75 |

Primary Examiner—Gerald P. Tolin
Assistant Examiner—Mark H. Paschall
Attorney, Agent, or Firm—Jones, Tullar & Cooper

[57] ABSTRACT

A transferred type plasma torch comprises a body containing and rigidly interconnecting; a bushing having an internal constricted surface, a collet attachment mounted in the bushing, an electrode mounted in the collet attachment, a nozzle tip disposed coaxially of the electrode at the tip, and a centrally bored end cap screwed in the end of the bushing and having an internal countersunk surface. The collet attachment is composed of a cylindrical collet having a spherical flanged portion and a collet chuck having a spherical flanged end portion and mounted in the collet, the spherical flanged portion of the collet being received in the internal constricted surface of the bushing, the spherical flanged end portion of the collet chuck being received in the internal countersunk surface of the end cap. The spherical flanged portion of the collet and the spherical flanged end portion of the collet chuck are so designed that they have the same center of curvature.

5 Claims, 10 Drawing Figures

TRANSFERRED TYPE PLASMA TORCH

BACKGROUND OF THE INVENTION

The present invention relates to plasma torches and, more particularly, to transferred type plasma-arc torches for use in welding and cutting of metals.

As is well-known, transferred type plasma torches have been widely used for welding and cutting metals. In such torches, it is essentially required that an electrode be centered in a tubular nozzle constricted at the tip to form a narrow passage, through which plasma forming gas is directed to the point to be cut or welded in the workpiece. If the electrode is not centered in the nozzle, it is difficult to produce a stabilized plasma arc, resulting in the failure of the function of the torch.

Many attempts have been made to center the electrode in the nozzle, with an error of not more than 0.1 mm. It is, however, very difficult to locate the electrode in the position prescribed even when using precisely worked parts for the torches. Because, the error in the relative position occurs between the nozzle and the electrode, the nozzle tip is mounted in the torch body by means of a jacket and an insulating adaptor, while the electrode is mounted in the body by means of a collet attachment.

It is therefore an object of the present invention to provide a transferred type plasma torch wherein an electrode can be located in the position prescribed with ease and, centered in a nozzle with high precision.

Another object of the present invention is to provide a transferred plasma torch wherein the displacement of the electrode due to the impacts applied on the torch can be prevented.

A further object of the present invention is to provide a transferred type plasma torch which can be manufactured at a moderate price.

SUMMARY OF THE INVENTION

The transferred type plasma torch according to the present invention comprises a body containing and rigidly interconnecting a bushing having an internal, constricted surface at the tip, a collet attachment mounted in said bushing, an electrode mounted in said collet attachment, a nozzle tip disposed coaxially of said electrode at the tip of said body, an end cap screwed in the bushing and having a hole with an internal countersunk surface at the tip, and an electrically insulating adaptor disposed between said bushing and a jacket adapted to insulate the electrode and the nozzle tip and to mount the tip in the body. The collet attachment is composed of a cylindrical collet having a spherical flanged portion, and a collet chuck having a spherical flanged end portion and mounted in the collet, said spherical flanged portion of the collet being received in the internal constricted surface of the bushing. The collet has internal tapered and cylindrical surfaces mated with each other. The collet chuck has an external tapered surface and external, cylindrical surfaces stepped into two portions having different diameters, which are mated to each other, a part of the front portion of the collet chuck being forked into two parts, said external tapered surface of the collet chuck being in contact with said internal tapered surface of the collet to hold the electrode, the spherical flanged end portion of the collet chuck being received in the countersunk portion of the internal surface of the end cap. The spherical flanged portion of the collet and the spherical flanged end portion of the collet chuck are so designed that they have the same center of curvature when they are assembled.

The internal constricted surface of the bushing may have a conical or spherical form adapted to receive the spherical flanged portion of the collet. Also, the internal countersunk surface of the end cap may be a conical or spherical form adapted to receive the spherical, flanged end portion of the collet chuck.

According to the present invention, the collet attachment is composed of a collet having a spherical flanged portion adapted to be received in the internal constricted surface of the bushing, and a collet chuck having a spherical flanged end portion adapted to be received in the countersunk surface of the end cap, which are so designed that the spherical flanged portion and the spherical flanged end portion have the same center of curvature with one another. Thus, the collet attachment may be movable along the internal constricted surface of the bushing and the countersunk surface of the end cap during the attachment of the end cap, thus making it possible to center the electrode in the nozzle with high precision only by screwing the end cap in the bushing even when a bent electrode is used. Since the force acting on the above spherical portions is directed toward the center of curvature, the collet and the collet chuck can be rigidly joined to each other and fixed in position, thus making it possible to prevent the displacement of the electrode from the prescribed position when mechanical shocks or impacts are applied to the torch in use. In addition, since the collet attachment is movable during the attachment of the end cap, the electrode may be centered in the nozzle with high precision even when not so very precisely worked parts are used. Thus, the plasma torch according to the present invention may be manufactured at a moderate price.

BRIEF DESCRIPTION OF THE DRAWINGS

These and other objects, features and advantages of the preferred present invention will be further apparent from the following description of the embodiment of the invention illustrated in the accompanying drawings, in which.

DETAILED DESCRIPTION OF THE INVENTION

Figure 1:
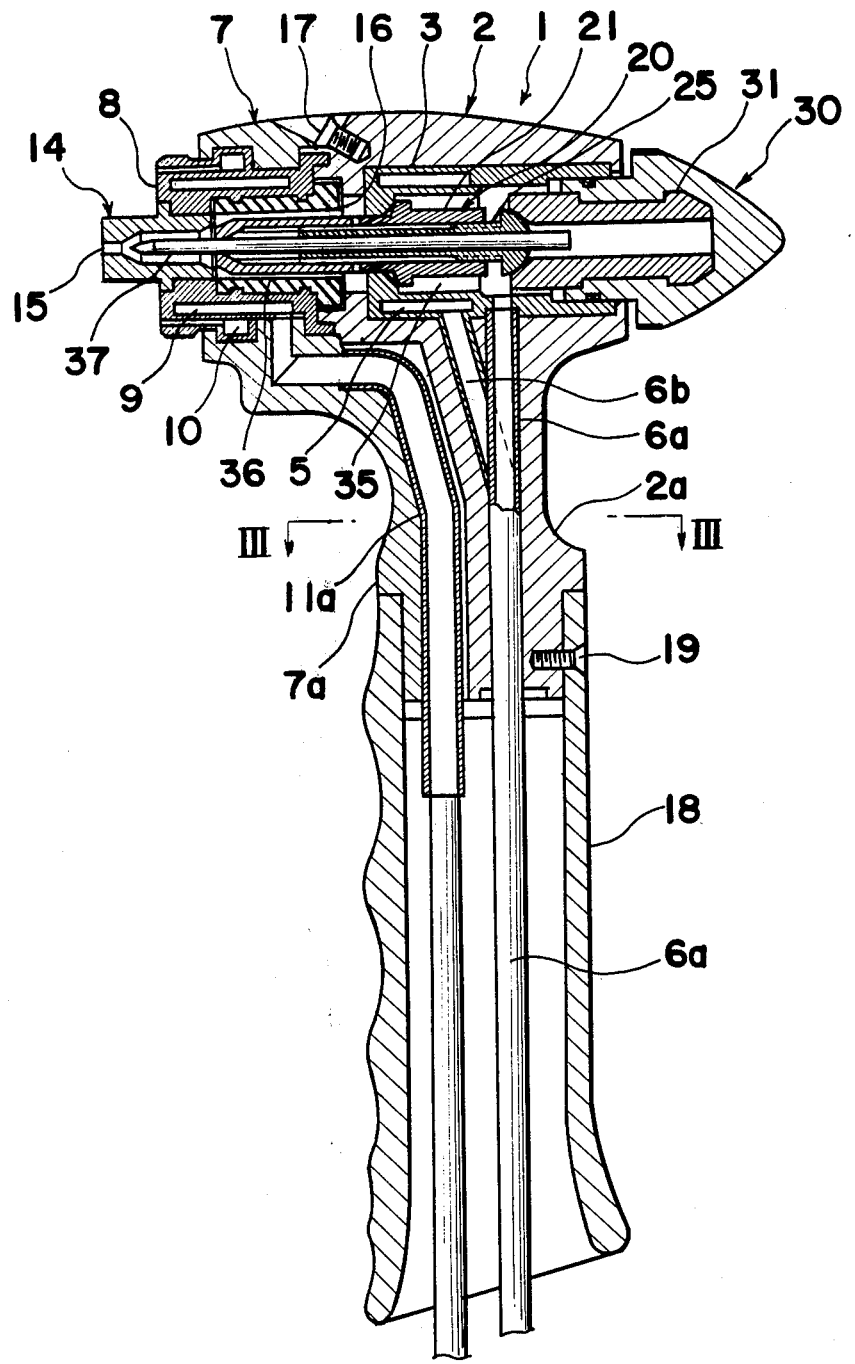
FIG. 1 is a sectional side elevation showing a transferred type plasma-arc torch according to the present invention.

Referring now to the drawings, the plasma torch 1 (FIG. 1) according to the present invention comprises three detachable and tightly joined sections, i.e., a front section 7, a middle section 2, and a rear section 30. All the three sections are described below in detail.

Figure 2:
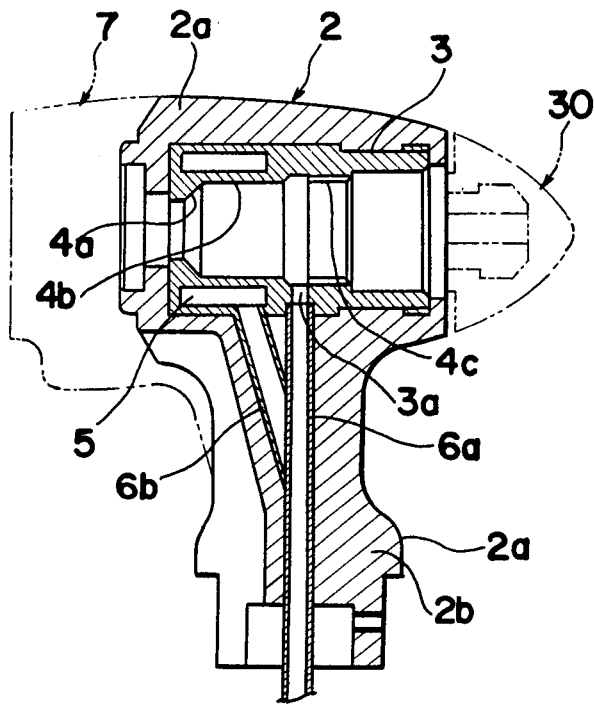
FIG. 2 is a section view showing a torch body of FIG. 1.
Figure 3:
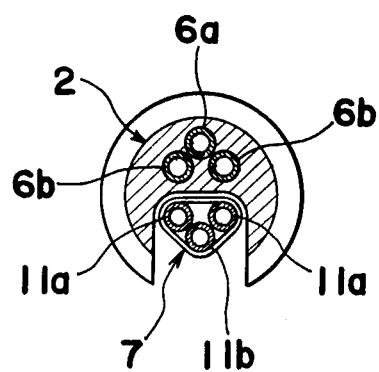
FIG. 3 is a horizontal sectional view taken on line III—III of FIG. 1.
Figure 4:
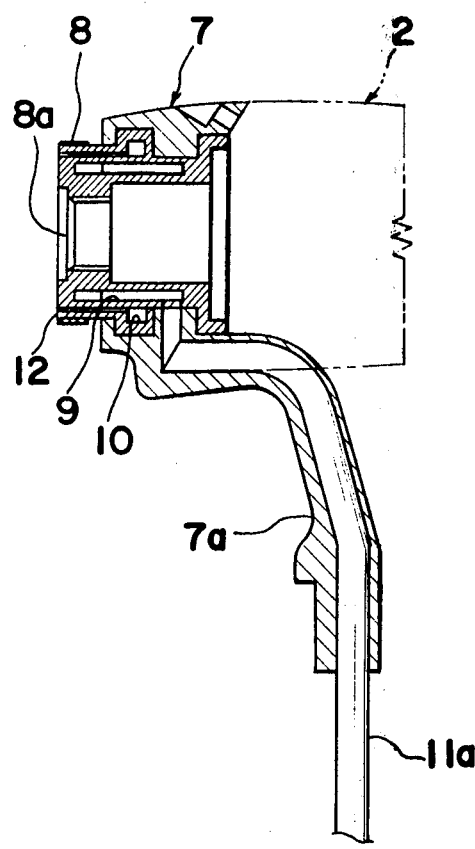
FIG. 4 is a section view showing a tip end of the torch of FIG. 1.

The middle section comprises a body member 2a which houses a collet attachment or assembly 20 adapted to hold an electrode 37. The body member 2a is formed from an insulating material such as synthetic resin and, includes in its interior a cylindrical, water-cooled bushing 3 of metal as an integral part thereof, as shown in FIG. 2. The internal side surface of the bushing 3 has a cylindrical portion 4b adapted to constitute a wall of an annular, plasma forming-gas inlet chamber 35, and a cylindrical, threaded portion 4c adapted to grapple with a part of the rear section 30. The bushing 3 has an internal tapered surface 4a adapted to receive a spherical portion of a collet 21 at the tip, and an annular chamber 5 in its wall. The wall of the bushing 3 is provided with a port 3a to communicate the plasma forming-gas inlet chamber 35 with a gas tube 6a which in turn is connected to a plasma forming gas source (not shown in the drawings). The annular chamber 5 is communicated with two water tubes 6b, and fed the cooling water from the cooling-water source (not shown) through one of the tubes 6b. The cooling water fed into the chamber 5 drains off therefrom through the other water tubes 6b. The tubes 6a and 6b are arranged in a leg portion 2b of the body member 2a as shown in FIG. 3.

Figure 5:
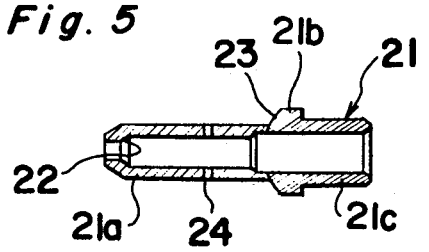
FIG. 5 is a section view of a collet used in the torch of FIG. 1.
Figure 6:
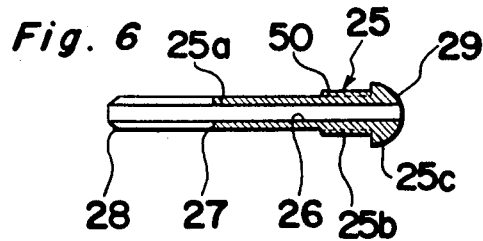
FIG. 6 is a section view of a collet chuck used in the torch of FIG. 1.
Figure 7:
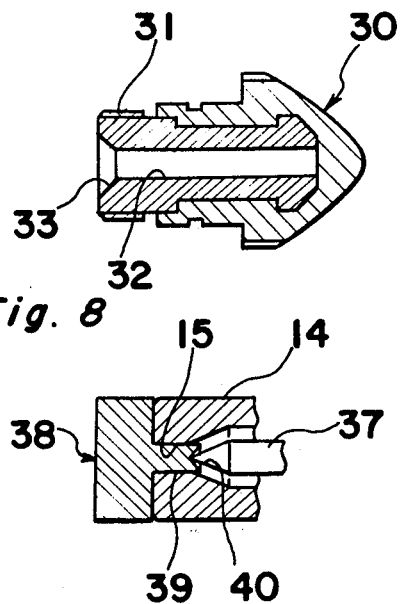
FIG. 7 is a section view of end cap used in the torch of FIG. 1.

The collet attachment or assembly 20 comprises a cylindrical collet 21, as seen in FIG. 5, and, a collet chuck 25, as seen in FIG. 6, with a centrally formed hole 26 into which the electrode 37 is inserted. The internal tip end of the collet 21 is tapered to form an internal conical surface 22 adapted to receive a conical tip end 28 of the collet chuck 25. The collet 21 has a spherical flanged portion 21b with a spherical surface 23 at the tip side and, is provided with a plurality of ports 24 bored radially in its forwardly elongated portion 21a. The collet chuck 25 has an external cylindrical surface stepped into two different diameters. The front portion 25a having a smaller diameter is forked into two parts at its front half by split 27 and, the rear portion 25b having a larger daimeter has axially elongated grooves 50 along its external surface to form passages for the plasma forming gas. The flanged end portion of the collet chuck 25c is shaped to form a coaxial spherical surface 29. This spherical surface is so designed that the center of curvature thereof cooperates with that of the spherical surface 23 of the collet 21 to define a sphere when the collet 21 and the collet chuck 25 are held in position. The electrode 37 is inserted into the longitudinal hole 26 of the collet chuck 25 so that the tip end of the electrode 37 projects from the tip of the collet chuck 25. The collet chuck is then inserted into the collet 21 so that the tapered surface 28 of the collet chuck 25 is thrusted against the conical internal surface 22 of the collet 21. This collet attachment or assembly 20 is then inserted into the bushing 3 and held in position by the attachment of the end cap 31 of the rear section 30. Between the external surface of the cylindrical portion 21c of the collet 21 and the cylindrical internal surface 4b of the bushing 3 there is formed an annular chamber 35 which is communicated with the plasma forming-gas feed tube 6a and the passage formed between the external surface of the collet chuck 25 and the internal surface of the collet 21 through the grooves 50.

The front section 7 comprises a front body 7a of an insulating material such as synthetic resin, and a cylindrical, water-cooled jacket 8 of metal with inner and outer annular chambers 9 and 10. The outer chamber 10 communicates with the atmosphere at the front end of the jacket 8 through a plurality of axially bored nozzles 12 around a nozzle tip 14, and is adapted to receive a shielding gas feed tube 11b which in turn is connected to a shielding-gas source (not shown). The shielding-gas fed from the source is blown through the nozzles 12 to form the gas shield around the plasma jet. The inner annular chamber 9 is communicated with cooling-water tubes 11a. The cooling water is fed into the chamber 9 through one of the tubes 11a from a cooling-water source (not shown) and flows away therefrom through the other tube 11a. The tubes 11a and 11b are disposed in a groove provided in the leg portion 2a of the body. The tip 14 with a central, strictured nozzle 15 is screwed in the front end of the jacket 8 in alignment with the opening of the jacket 8. In the rear end of the jacket, or between the bushing 3 and the jacket 18 there is arranged a cylindrical, electrically insulating adaptor 16 to insulate the tip 15 from the collet chuck assembly 20 and the electrode 37. The leg portion 7b of the front body 7a is mated with the leg portion 2b of the body 2a and then inserted into the upper opening of the handle 18. The leg portions 2b and 7a are tightly joined to the handle 18 by screws 19.

The rear section 30 comprises a cylindrical cap member 31 encapsulated with an insulating material such as synthetic resin and adapted to be screwed in the bushing 3. The member 31 has a cylindrical bore 32 having a countersunk portion 33 adapted to receive the spherical rear portion 29 of the collet chuck 25. When the cap section 30 is screwed in the rear end of the bushing 3 in the body 2, the collet chuck 25 is pushed in the collet 21, and its tapered surface 28 is thrusted on the conical surface 22 of the collet 21. This causes the slitted end of the collet chuck 25 to tighten the electrode 37. At the same time, the collet chuck assembly 20 is fixed in the bushing 3 since the spherical portion 23 of the collet is received in the conical recess 4a of the bushing 8 and the spherical portion 29 of the collet chuck 25 is received in the conical surface 33 of the cap member 31. In this case, since the force acting on the spherical portions 23 and 29 directed toward the center of curvature of spherical portions, the collet assembly is corrected in its direction so that the conical tip end of the electrode is centered in the nozzle constricted at the tip and the electrode is held in the position as decided.

In use, the plasma forming gas is introduced into the annular chamber 35 through the tube 6a, flows into the annular passage 51 between the external surface of the collet chuck 25 and the internal surface of the collet 21 through the grooves 50, then into the annular passage 36 formed between the external surface of the collet 21 and the internal surface of the insulating adaptor 16 through the ports 24, and is finally directed to the point to be cut or welded in the workpiece through the nozzle 15 of the tip 14.

The electrode 37 and nozzle 14 are electrically connected to a power supply source (not shown) through the bushing and the jacket, respectively, in the known manner.

Figure 8:
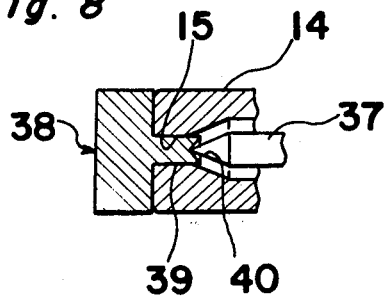
FIG. 8 is an enlarged section view of a tip gage used for centering of electrode.

The plasma torch 1 is assembled in the following manner. The body member 2a and into the front body 7a are jointed by screws 17, and then fixed to the handle 18. The nozzle tip 14 is screwed in the tip of the jacket 8 and, the nozzle 15 is inserted a tip gage 38 having an external, cylindrical surface stepped into two portions having different diameters, as shown in FIG. 8. The smaller diameter portion 39 has, at its end surface, a centrally and conically formed standard recess 40 adapted to receive the conical tip end of the electrode 37 to center the electrode 37 in the nozzle 15. The electrode is mounted in the collet chuck 25 which in turn is mounted in the collet 21 to assemble the collet attachment 20. The collet attachment 20 is mounted in the bushing 3, so that the tip end of the electrode 37 is contacted with and moved along the surface of the standard recess 40 of the tip gage 38, and finally positioned in the center of the standard recess 40. At the same time, the spherical flanged portion 23 of the collet 21 is contacted with the internal tapered surface 4 of the bushing 3. After that, the end cap 30 is screwed in the end of the bushing 3 to locate the electrode 37 and collet attachment 20 in the position prescribed. The electrode 37 is tightened between the forked front portions of the collet chuck 25, centered in the nozzle and fixed in the prescribed position. The spherical flanged portion 23 of the collet 21 is thrusted on the internal tapered surface 4a of the bushing 3 by the force acting on the spherical flanged end portion 29 of the collet chuck 29, so that the collet attachment 20 is also fixed in position. By removing the tip gage 38 from the nozzle tip, the plasma torch assembled as shown in FIG. 1 is obtained.

Figure 9:
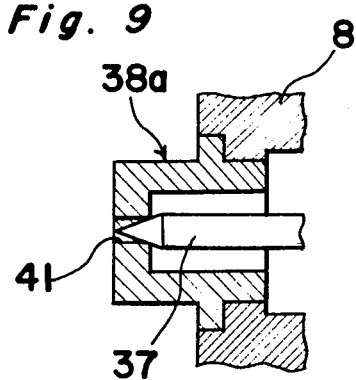
FIG. 9 is an enlarged section view showing another embodiment of the centering means.

When the tip is damaged, it can be replaced with a new one in the same manner as described above. It is to be noted that a cylindrical, tip gage 38a having an internal surface stepped into two portions with different diameters as shown in FIG. 9 may be used for centering the electrode in the nozzle. In this case, the tip gage 38a having the same working precision that the nozzle tip 14 has, is being screwed in the jacket 8 instead of the nozzle tip during centering of the electrode. After the centering of the electrode, this tip gage is replaced with the tip to be used.

Figure 10:
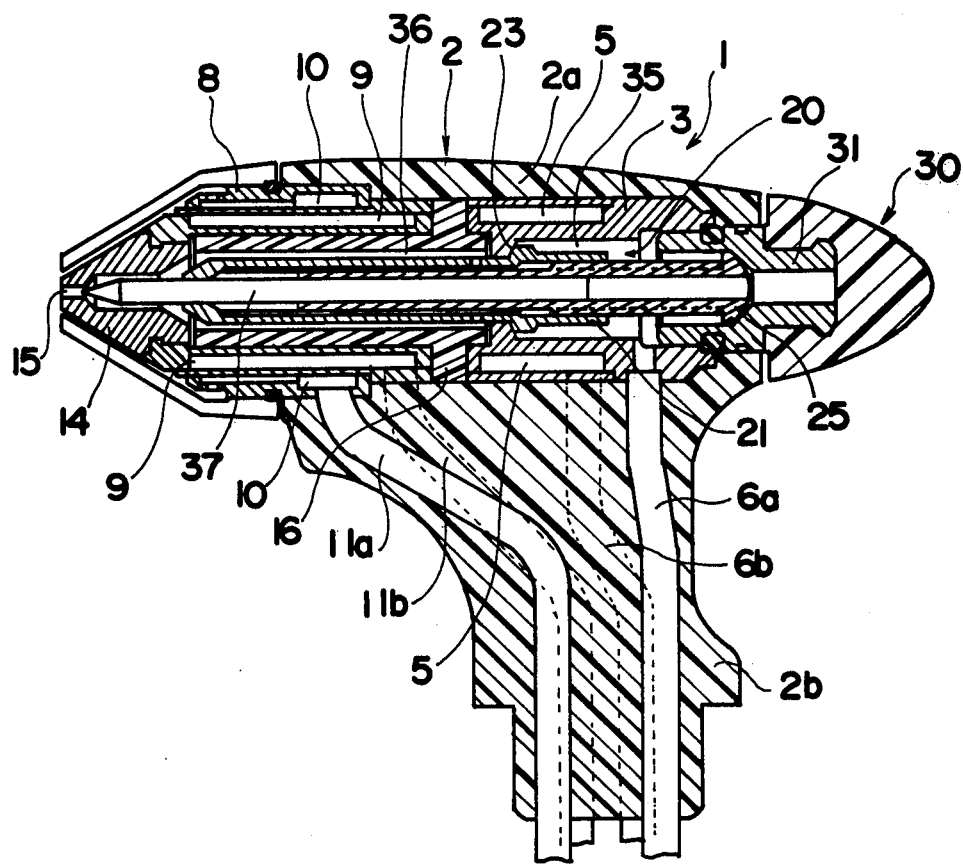
FIG. 10 is a section view of a plasma torch showing another embodiment of the present invention.

In the above embodiment, the body member 2a and the front body 7a are separately molded, but they may be molded in one body, as shown in FIG. 10 which show another embodiment of the present invention. This plasma torch has the same construction as the torch in the embodiment of FIG. 1 except that the electrically insulating adaptor is directly dispose between the bushing 3 and the jacket 8.

What I claim is:

1. A transferred type plasma torch having a multisection body, said sections being rigidly interconnectable to correctly position an electrode in said plasma torch body, said body comprising:

a middle body section having a central bushing provided with an internal constricted surface at its forward end and a collet attachment assembly mounted in said bushing, said collet attachment assembly holding an electrode;

a front body section having a nozzle tip disposed coaxially of said electrode;

a rear body section having a centrally bored end cap, said end cap having an internal countersunk forward end surface;

said collet attachment assembly comprising a cylindrical collet having a spherical flanged portion intermediate its ends and an internal conical surface at its forward end, and a collet chuck telescopingly carried in said collet with a split conical forward tip end of said collet chuck engaging said internal conical surface of said cylindrical collet, and a spherical rear end portion of said collet chuck being received in said countersunk end of said end cap, said spherical flanged portion of said cylindrical collet contacting said internal constricted surface of said central bushing, said electrode being held in said collet chuck, said spherical end surface of said collet chuck and said spherical flanged portion of said cylindrical collet being cooperatively curved and positioned in said rear and middle body sections whereby said electrode is carried in said plasma torch properly positioned in said nozzle tip.

2. The plasma torch according to claim 1 wherein the internal constricted surface of the bushing is in the form of conical or spherical.

3. The plasma torch according to claim 1 wherein the internal countersunk surface of the end cap is in the form of conical or spherical.

4. The plasma torch according to claim 1 wherein the internal constricted surface of the bushing and the internal countersunk surface of the end cap are in the form of conical.

5. The plasma torch according to claim 1 wherein the internal constricted surface of the bushing and the internal countersunk surface of the end cap are in the form of spherical.

* * * * *